(12) United States Patent
Yuri et al.

(10) Patent No.: US 6,471,213 B1
(45) Date of Patent: Oct. 29, 2002

(54) SEAL STRUCTURE FOR GAS TURBINE

(75) Inventors: Masanori Yuri, Takasago (JP);
Toshishige Ai, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/281,804

(22) Filed: Mar. 31, 1999

(30) Foreign Application Priority Data

Apr. 1, 1998 (JP) .......................................... 10-088739
May 21, 1998 (JP) .......................................... 10-139767

(51) Int. Cl.$^7$ ................................................ F16T 15/44
(52) U.S. Cl. ...................................... 277/355; 277/416
(58) Field of Search .............................. 277/355, 412, 277/413, 416, 420

(56) References Cited

U.S. PATENT DOCUMENTS

| | | | |
|---|---|---|---|
| 4,331,337 A | * 5/1982 | Cross et al. | |
| 4,358,120 A | * 11/1982 | Moore | 277/355 |
| 5,071,138 A | 12/1991 | Mackay et al. | |
| 5,316,318 A | * 5/1994 | Veau | 277/355 |
| 5,401,036 A | * 3/1995 | Basu | 277/355 |
| 5,630,590 A | * 5/1997 | Bouchard et al. | 277/355 |
| 5,749,584 A | * 5/1998 | Skinner et al. | 277/355 |
| 5,961,279 A | * 10/1999 | Ingistov | 415/170 |
| 6,032,959 A | * 3/2000 | Carter | 277/355 |
| 6,131,910 A | * 10/2000 | Bagepalli et al. | 277/355 |
| 6,131,911 A | * 10/2000 | Cromer et al. | 277/355 |

FOREIGN PATENT DOCUMENTS

| | | |
|---|---|---|
| EP | 816 726 A | 1/1998 |
| EP | 979 963 A | 2/2000 |
| EP | 989 342 | 3/2000 |
| EP | 1 013 975 | 6/2000 |
| WO | 00 47919 A | 8/2000 |

* cited by examiner

*Primary Examiner*—Anthony Knight
*Assistant Examiner*—Alison K. Pickard
(74) *Attorney, Agent, or Firm*—Wenderoth, Lind & Ponack, L.L.P.

(57) ABSTRACT

A seal ring separating surface for a gas turbine, which sets a shape of an end portion in the separation surface to a cutting surface and reduces the leaking amount of sealing air. A seal ring holding ring (1) fixes brush seals (3, 4) on an upstream side of a stationary blade by bolts (5, 6) respectively, so as to form a seal with respect to a rotor disc (69). Further, the seal ring holding ring (1) fixes and supports a seal ring (2) on a downstream side by a bolt (7) so as to form a seal with respect to a seal portion (8) on the disc (69) side. The brush seals (3, 4) and the seal ring (2) are structured so as to have a circular ring shape and a separation construction, and each of the separation pieces has a gap, so that sealing air can leak to a downstream side from an upstream side through the gap. However, since the separation piece end portion is formed in a cutting surface and the shape of the gap is formed in a bypass passage, the resistance of an air flow passage is increased and the amount of leaking air amount is reduced.

9 Claims, 10 Drawing Sheets

SEAL STRUCTURE FOR GAS TURBINE

BACKGROUND OF THE INVENTION

1. Field of the Invention

The present invention relates to a seal structure for a gas turbine, and more particularly to a seal separating surface connecting structure which reduces the amount of air leaking from a seal separating surface and improves sealing performance, and a structure which employs a brush seal so as to prevent a support plate of the brush seal from seriously contacting with a rotation side and which provides a small sealing interval so as to improve the sealing performance.

2. Description of Related Art

Figure 9:
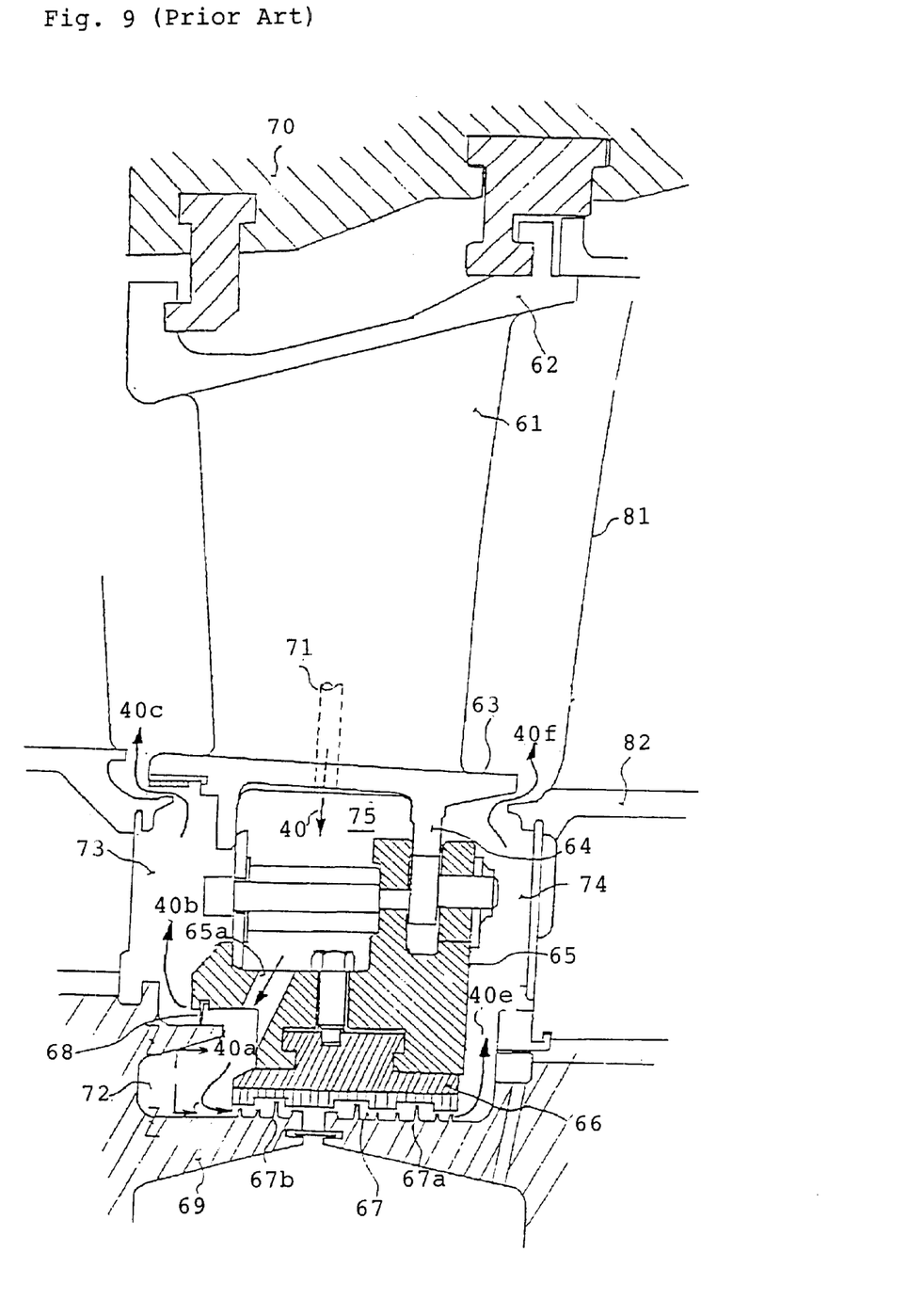
FIG. 9 is a cross sectional view which shows a seal structure of the conventional gas turbine.

FIG. 9 is a cross sectional view which shows a general seal structure for a conventional gas turbine. In the drawing, reference numeral 61 denotes a stator blade, reference numeral 62 denotes an outer shroud thereof, and the outer shroud 62 is supported by a blade ring 70. Reference numeral 63 denotes an inner shroud, reference numeral 64 denotes a flange portion thereof and reference numeral 65 denotes a seal ring holding ring. The seal ring holding ring 65 is held by the flange portion 64 of the inner shroud 63, and supports a seal ring 66 in an inner side (a rotor side) thereof. Reference numerals 67 and 68 denote seal portions, and seal fins 67a and 67b are provided in a side of a rotor disc 69, thereby constituting a seal portion in opposition to the seal portion of the seal ring 66. Reference numeral 81 denotes a rotor blade, and reference numeral 82 denotes a platform thereof. The platform 82 is mounted on the rotor disc adjacent to the stator blade 61 and rotates together with the rotor. Reference numeral 71 denotes a tube for sealing air, which is provided within the stator blade 61, extends through the inner shroud 63 from the outer shroud 62 and is structured so as to introduce the sealing air within a cavity 75. Reference numerals 72, 73 and 74 denote spaces formed with respect to the adjacent rotor blade.

In the stator blade having the structure mentioned above, air 40, introduced from an inner portion of the sealing air tube 71 within the stator blade 61 to an inner portion of the cavity 75, passes through a hole 65a in the seal ring holding ring 65 and flows into the space 72 as shown by reference symbol 40a, and a part thereof flows out from the space 72 to the space 73 as leaking air from the seal portion 68 as shown by reference symbol 40b, passes between the platforms of the rotor blade adjacent to the inner shroud 13 as shown by reference symbol 40c and flows out to a main current gas passage.

Further, the air also flows out to the space 74 from the space 72 through the portion between the seal ring 66 and the seal portions 67a and 67b as shown by reference symbol 40e, and flows out from there through the portion between the inner shroud 63 and the platform 82 of the adjacent rotary blade 81 as shown by reference symbol 40f. A pressure within the cavity 75 and the spaces 72, 73 and 74 is increased in comparison with the outer main current gas passage due to the air flows mentioned above, thereby preventing the high temperature combustion gas from entering the inner portion. Accordingly, in order to increase sealing performance, it is necessary to increase the sealing performance of a labyrinth seal formed by the seal ring 66, the seal portion 67 on the rotor side and the seal portion 68 so as to reduce the amount of leaking air represented by reference symbols 40b, 40c, 40e and 40f. When it is possible to reduce the flowing-out air amount, it is possible to reduce the sealing air amount, so that it will be possible to improve the performance of the gas turbine as a whole.

Figure 10A:
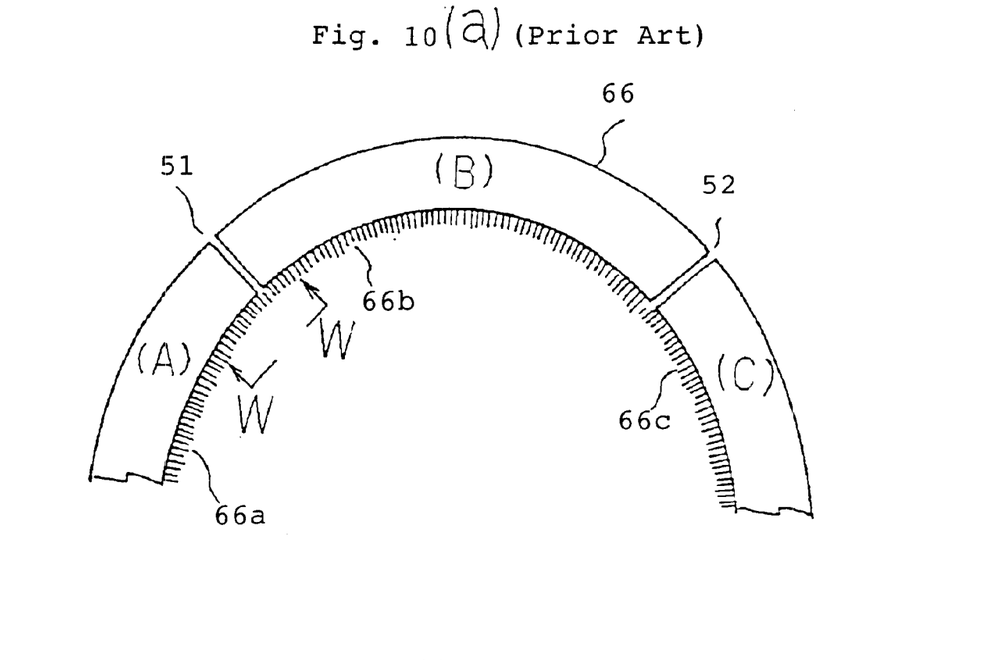
FIG. 10(a) is a schematic view taken along line Z—Z and FIG. 10(b) is a schematic view taken along line W—W in FIG. 10(a)
Figure 10B:
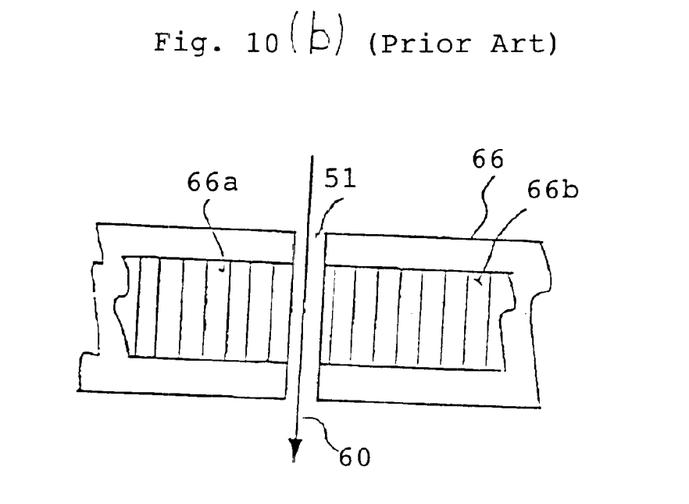

FIG. 10(a) is a schematic view as seen from a line Z—Z in FIG. 9, which illustrates an upper half of the seal ring 66. Further, FIG. 10(b) is a schematic view taken along a line W—W in FIG. 10(a). The seal ring 66 is formed in a circular ring shape and is separated into a plurality of portions, and in the drawing, the upper half portion is separated into three portions comprising portions (A), (B) and (C) (totally separated into four portions). Fins 66a, 66b and 66c are respectively mounted on the separated pieces (A), (B) and (C), which are opposed to the seal portions 67a and 67b in the side of the rotor disc 69. In the separated structure of the seal ring 66 mentioned above, a gap 51 is disposed between the separated pieces (A) and (B), a gap 52 is disposed between the separated pieces (B) and (C), and air flows out from an upstream space 72 (see FIG. 9) to a downstream space 74 (see FIG. 9) as the leaking air 60 flows through gap 51 as shown in FIG. 10B, so that the seal performance of the seal ring 66 is lowered.

As mentioned above, the seal structure of the conventional gas turbine is structured such that the seal ring 66 is separated into a plurality of portions, as mentioned above, and has a gap at a connecting end surface between the separated pieces of each of the seal rings. It is necessary to structure the gap such that a certain degree of gap is kept in connection with the thermal expansion of the seal ring. The gap is formed in a straight shape from the upstream side of the main current gas to the downstream side, and the sealing air leaks from the upstream side to the downstream side, so that the performance of the labyrinth seal constituted by the seal portion of the seal ring 66 and the seal portion 67 of the rotor disc 69 is reduced, and the amount of sealing air is increased, thereby providing an effect on the performance of the whole of the gas turbine.

Figure 11:
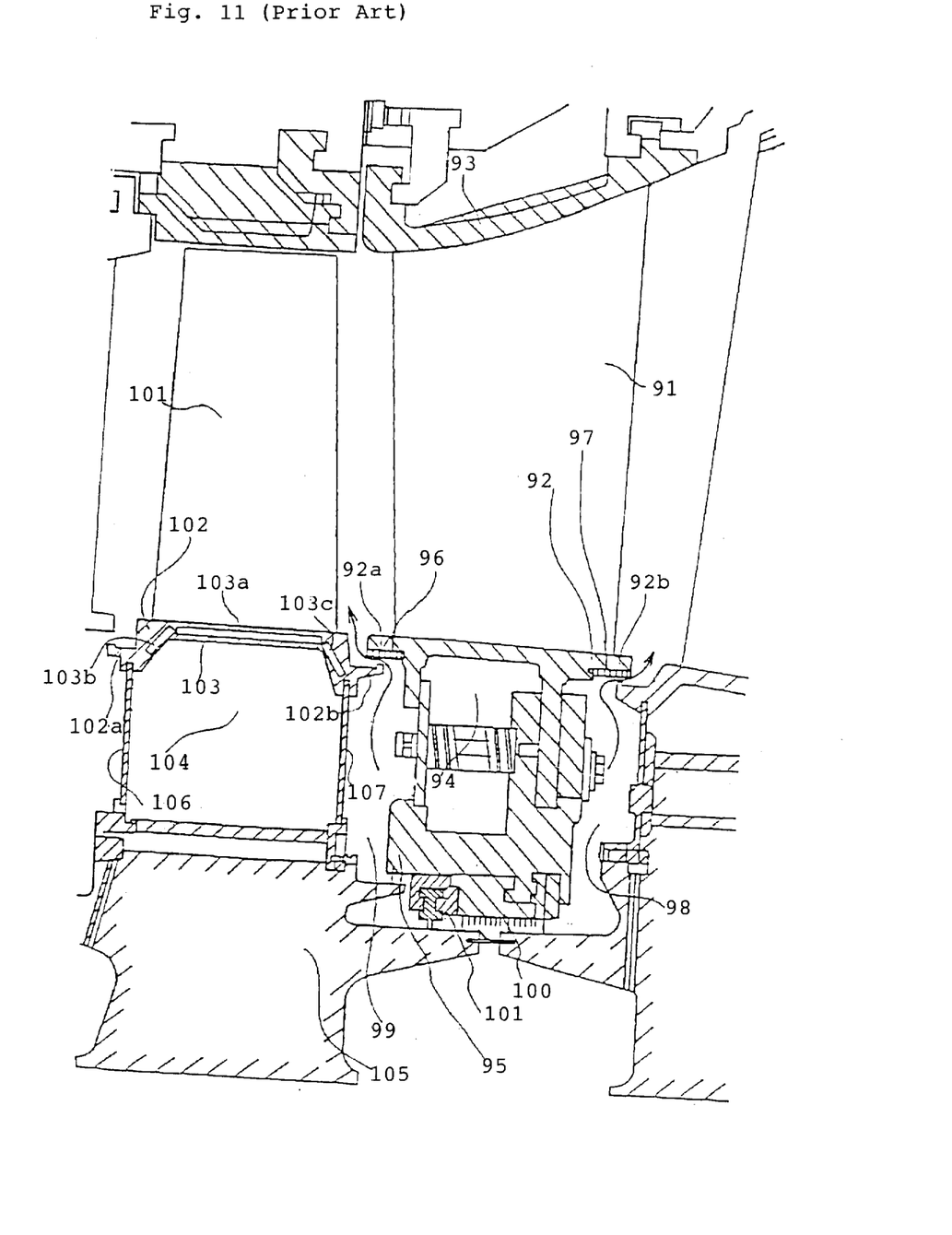
FIG. 11 is a general cross sectional view of a rotor blade and a stationary blade of the conventional gas turbine.

Further, in recent years, in order to improve the seal performance of the stator side and the rotor side in the gas turbine for a flying machine or an industrial machine, the brush seal is going to be used. FIG. 11 is a representative cross sectional view of the industrial gas turbine, in which reference numeral 101 denotes a rotor blade, reference numeral 102 denotes a platform and reference numeral 103 denotes a seal pin within the platform 102, which is constituted by portions 103a, 103b and 103c. Reference numerals 102a and 102b denote a seal portion at both end portions in front and rear with respect to the axial direction of the platform 102. Reference numeral 104 denotes a shank portion and seal plates 106 and 107 are provided at the front and at the rear of the shank portion. Reference numeral 105 denotes a disc for a rotor, to which parts of each of the rotor blades 101 to 104 are mounted.

Reference numeral 91 denotes a stator blade, reference numeral 92 denotes an inner shroud and reference numeral 93 denotes an outer shroud. Reference numerals 92a and 92b denote the front and rear end portions with respect to an axial direction of the inner shroud 92. Reference numeral 94 denotes a cavity formed within the inner shroud 92, into which the sealing air is flowed through from the inner portion of the stator blade 91. Reference numeral 95 denotes a seal box, which holds a labyrinth seal 100 at one portion and a brush seal 101 at the other portion. Reference numerals 96 and 97 denote honeycomb seals provided at both end portions 92a and 92b of the inner shroud 92, respectively. Reference numerals 98 and 99 denote spaces formed with respect to each of the adjacent front and rear rotor blades, which correspond to flow passages for the sealing air.

In the gas turbine having the structure mentioned above, the sealing air is introduced into the cavity 94 from a sealing air passage (not shown) passing through the inner shroud 92 after passing from the side of the outer shroud 93 in the stator blade 91 through the inner portion of the blade. The air flows out into the space 99 from a hole (not shown) provided in the seal box 95. The air then passes through the honeycomb seal 96 provided at the end portion 92a of a the inner shroud 92, and flows out into the combustion gas passage. Further, a part of the sealing air flowing out from the hole in the seal box 95 also flows out to the forward space 98 through the brush seal 101 and the labyrinth seal 100 with respect to the disc 105. The air then flows out into the combustion gas passage through the honeycomb seal 97 provided at the front end portion 92b of the inner shroud 92.

As mentioned above, the sealing air is introduced within the cavity 94 through the inner portion of the stator blade 91, and the sealing air is introduced into the space 99, which is sealed by the honeycomb seal 96, from the cavity 94 and further into the forward space 98, sealed by the honeycomb seal 96, through the brush seal 101 and the labyrinth seal 100 with respect to the combustion gas passage, so that a pressure in the cavity 94 and the spaces 98 and 99 is increased higher than the pressure in the outer combustion gas passage, thereby preventing the high-temperature combustion gas from entering these areas.

Figure 7:
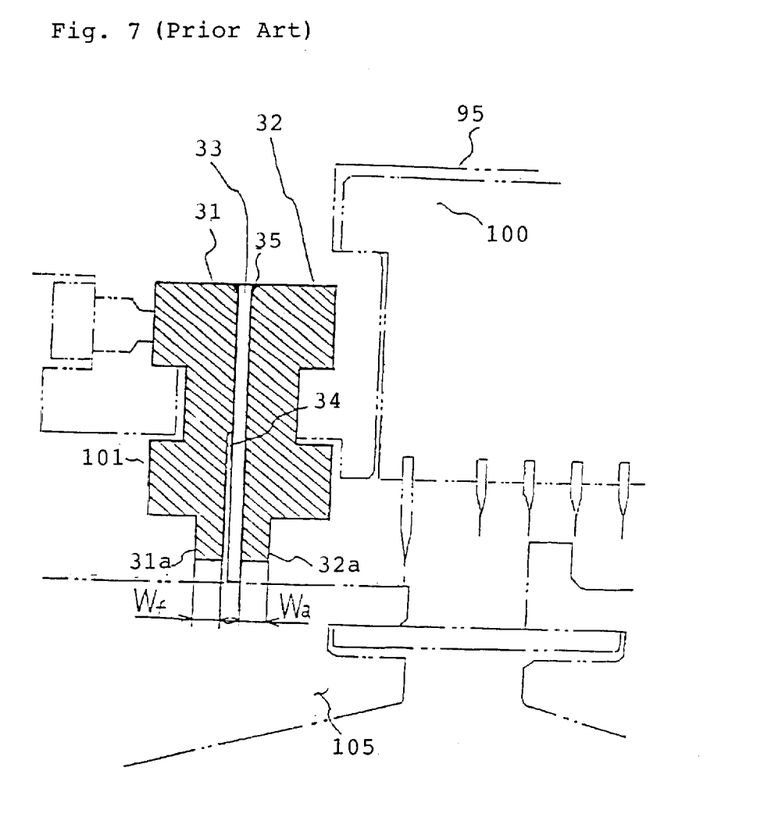
FIG. 7 is a cross sectional view of a brush seal of a conventional gas turbine.

FIG. 7 is an enlarged cross sectional view of the brush seal 101 corresponding to the seal portion of the gas turbine mentioned above. In the drawing, the brush seal 101 is mounted on the upstream side of the labyrinth seal 100 in the seal box 95 so as to constitute the seal portion with respect to the rotor disc 105. The brush seal 101 comprises a front portion support plate 31 and a rear portion support plate 32, a brush 33 comprising a multiplicity of narrow wires is fixed to a center portion thereof by a welding portion 35, and a front end thereof constitutes a seal portion in close contact with the disc 105. A gap 34 is provided between the front portion support plate 31 and the brush 33, and the structure is formed so as to move against a pressure in the upstream side. Widths Wf and Wa of support plate front ends 31a and 32a of the front portion and rear portion support plates 31 and 32 are set at about 2 mm, and the brush 33 is held at the front end portions.

Figure 8:
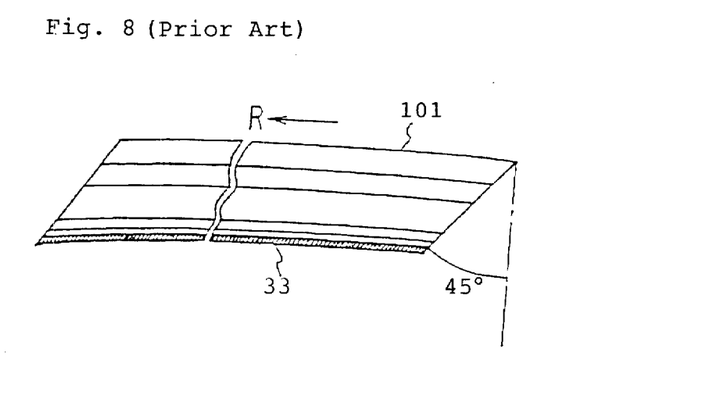
FIG. 8 is a plan view of a separation piece of the conventional brush seal.

FIG. 8 is a plan view of the brush seal 101, which is mounted after being separated into six portions in a circular ring shape, and an end surface thereof is brought into contact with the seal brushes adjacent to each other with an incline of 45 degrees in a rotational direction R with respect to a circular ring-like center line. The brush 33 is constituted by bundling a multiplicity of wires each having a diameter of 0.1 mm, and structured such that a width is set to about 2 mm and 1500 to 2000 wires are provided at each 25 mm length of the brush seal. The brush seal 101, structured in the above manner, is separated into six portions in a circumferential direction, and the front end of the brush 33 is in close contact with the disc 5 at the rotor side, thereby constituting the seal portion.

As mentioned above, the brush seal is used as the seal portion between the stationary portion and the rotary portion of the gas turbine. However; as shown in FIG. 7, the widths Wf and Wa of the front ends 31a and 32a of the support plate of the brush seal 101 are large at about 2 mm since they support the front end portion of the brush 33, so that the front end of the brush 33 deforms due to a thermal deformation of the disc 5 in the rotor side. In the case where the front ends 31a and 32a are brought into contact with the disc 105, the front ends 31a and 32a can cause serious damage on the surface of the disc 105 due to the significant rigidity thereof. Accordingly, the damage to the rotor seriously troubles the operation of the gas turbine, so that maintenance and replacement are performed on a large scale, and it is necessary to avoid the damage to the rotor as much as possible.

SUMMARY OF THE INVENTION

The present invention is made for the purpose of providing a seal structure for a gas turbine which designs a shape of a separation end portion of a seal ring, reduces the amount of air leaking from a separation portion, and improves a seal structure in the seal portion so as to improve sealing performance.

Further, the present invention is made for the purpose of improving the shape of a front end portion of a brush seal of a gas turbine, thereby avoiding double contact even when a rotor disc and a front end of the brush seal are brought into contact with each other so as not to seriously damage the rotor.

In order to achieve the objects mentioned above, the invention provides the following (1) to (5) items.

(1) A seal structure for a gas turbine comprising a seal ring holding ring supported on an inner shroud in a stationary blade, and a circular ring-like seal portion supported on the seal ring holding ring and surrounding a periphery of a rotor in a state of maintaining a predetermined gap obtained by taking thermal expansion into consideration between end portions of a plurality of separation pieces or contacting the end portions, thereby constituting a seal portion with the rotor. The circular ring-like seal portion is constituted by a brush seal at an upstream side of a main current gas and a labyrinth seal at a downstream side, and the end surfaces of each of the separation pieces of the brush seal and the labyrinth seal is formed in such a manner as to be in contact with each other at a cutting surface formed in a polygonal line.

(2) A seal structure for a gas turbine, as recited in the invention described in item (1), wherein the seal ring holding ring is separated into two portions at the upstream side and the downstream side, and one of them supports the brush seal and the other of them supports the labyrinth seal, respectively.

(3) A seal structure having a brush seal for a gas turbine comprising front and rear support plates mounted to a seal support portion inside a stationary blade of a gas turbine, a brush supported between front and rear support plates and a front end of the brush sealing with respect to a rotary portion in a rotor side. The front end portions of the front and rear support plates for supporting the front end portion of the brush have an axial thickness of 0.2 to 0.8 mm and are formed in a fin shape.

(4) A seal structure having a brush seal for a gas turbine as recited in item (3), wherein the front end portion of the support plate forms a fin shape by a smooth curved surface.

(5) A seal structure having a brush seal for a gas turbine as recited in item (3), wherein the front end portion of the support plate forms a fin shape by a straight tapered shape.

In the seal structure constructed in accordance with item (1) of the invention, since the upstream side of the circular ring-like seal portion is constituted by the brush seal, sealing performance is improved in comparison with the conventional labyrinth seal. Further, since the end surface of each of the separation pieces in the circular ring-like seal portion has the shape contact with each other at the cutting surface formed in the polygonal line, air that is going to flow out to the downstream side from the upstream side through the gap is hard to be leaked in comparison with the conventional straight flow passage because the flow passage becomes a bypass passage and a flow resistance is increased, even when a gap is generated due to a thermal deformation. Accordingly, the amount of air amount is leakage is reduced, sealing performance is improved, and the amount of air is reduced, so that performance of the whole of the gas turbine is improved.

In item (2) in accordance with the is invention, the seal ring holding ring is separated into two portions and one of the portions supports the brush seal and the other supports the labyrinth seal, respectively. Accordingly, in addition to the effect of item (1) mentioned above, there is an advantage in that an assembling and working performance thereof can be improved since the assembly of each of the brush seal and the labyrinth seal can be separately performed.

In the brush seal constructed in accordance with item (3) of the invention, the front end portions of the front and rear support plates for supporting the front end portion of the brush have a thickness of 0.2 to 0.8 mm which is thinner by 2 mm with respect to the conventional case, and is formed in a fin shape. In accordance with the structure mentioned above, the stationary side and the rotor side are thermally deformed, so that even when the front end of the support plate is brought into contact with the rotor side, the front end of the support plate deforms due to the thin fin shape and elasticity. Accordingly, the support plate side is deformed without being in double contact with the rigid body in the conventional art, or the support plate itself is broken, thereby avoiding damage to the rotor side. Further, since the double contact can be avoided and an elastic force can be added, the seal interval can be made smaller than in the conventional one, so that sealing performance can be improved.

In item (4) in accordance with the invention, since the front end portion of the support plate forms the fin shape by the smooth curved surface, and in item (5), the front end portion of the support plate forms the fin shape by the straight tapered shape, respectively, the front end portion gradually changes so as to form a narrow front end, so that the strength of the front end portion can be secured.

BRIEF DESCRIPTION OF THE DRAWINGS

FIGS. 2(a), 2(b) and 2(c) are schematic views which show a detail of a seal portion in FIG. 1, in particular.

FIGS. 6(a) and 6(b) are cross sectional views of a front end portion of a brush seal of a gas turbine in accordance with a fourth embodiment of the invention, in which FIGS. 6(a) and 6(b) show a circular arc shape and a straight tapered shape, respectively;

FIGS. 10(a) and 10(b) are schematic views which show details of the seal portion shown in FIG. 9, in particular

DETAILED DESCRIPTION OF THE PREFERRED EMBODIMENTS

Figure 1:
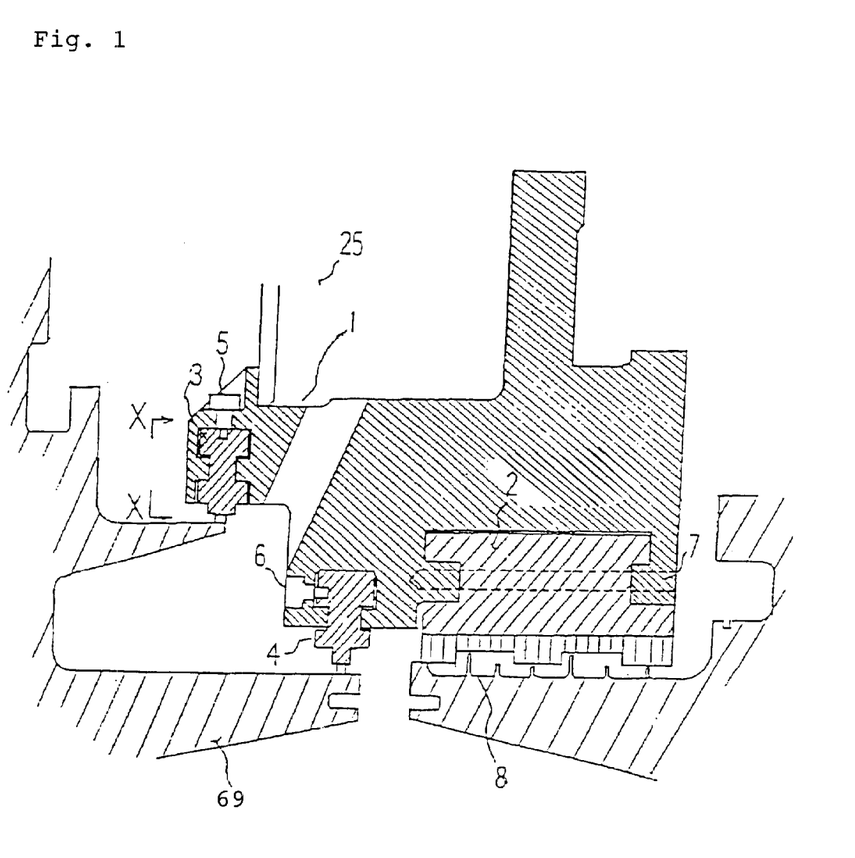
FIG. 1 is a cross sectional view which shows a structure of a seal separation surface of a gas turbine in accordance with a first embodiment of the invention.

Hereinafter, an embodiment in accordance with the invention will be particularly described below with reference to the accompanying drawings. FIG. 1 is a cross sectional view which shows a connecting structure of a seal separation surface of a gas turbine in accordance with a first embodiment of the invention, in which only a seal portion is shown in an enlarged manner.

In FIG. 1, reference numeral 1 denotes a seal ring holding ring, and reference numeral 2 denotes a seal ring supported by the seal ring holding ring 1. Reference numerals 3 and 4 denote brush seals, and the brush seal 3 is fixed to the seal ring holding ring 1 and is provided in place of the conventional seal portion 68 shown in FIG. 9. The brush seal 4 is provided for forming a seal portion in place of the upstream seal portion 67 of the conventional rotor disc 69. Reference numerals 5 and 6 denote a bolt for fixing the brush seals 3, 4 to the seal ring holding ring 1, respectively.

Reference numeral 7 denotes a bolt for fixing the seal ring 2 to the seal ring holding ring 1, and reference numeral 8 denotes a seal portion on the side of the rotor disc 69 which is the same as in the conventional one. The seal ring 2 is made smaller than the conventional seal ring 68 and is structured so as to form a labyrinth seal with respect to the seal portion 8 on the downstream side of the rotor disc 69 and to form a seal portion by the brush seals 3 and 4 at the upstream side. The other structures are the same as in the conventional embodiment shown in FIG. 9, and the operation of the seal is the same, so that description thereof will be omitted.

Figure 2A:
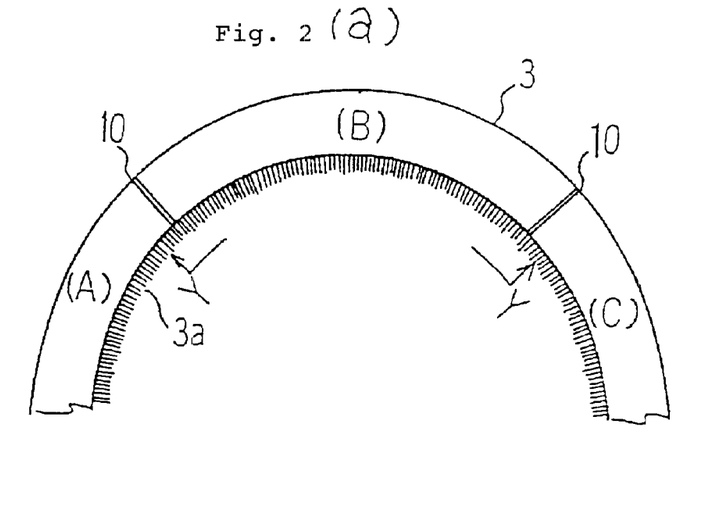
FIG. 2(a) is a schematic view taken along line X—X.
Figure 2B:
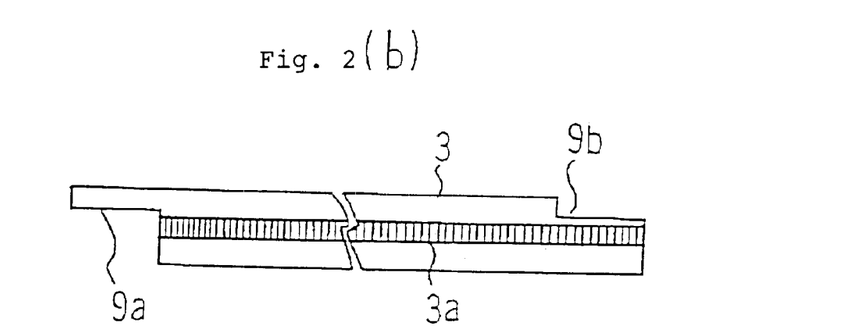
FIG. 2(b) is a schematic view showing a shape of an end portion in each of the separation pieces.
Figure 2C:
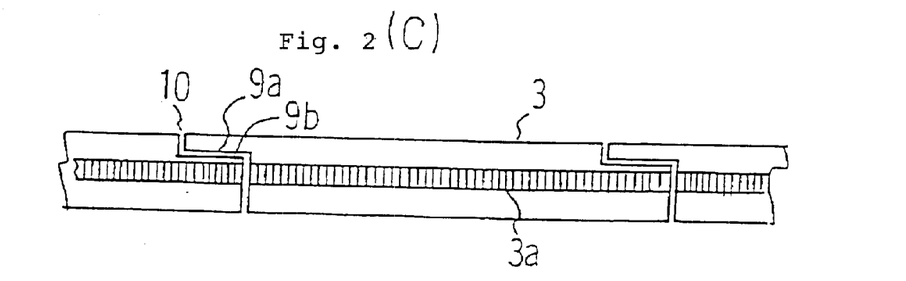
FIG. 2(c) is a schematic view along a line Y—Y in FIG. 2(a)

FIG. 2 is a schematic view taken along line X—X in FIG. 1, which shows an upper half portion of the brush seal 3. The brush seal 3 is separated into three portions (A), (B) and (C) (totally into four portions) as shown in FIG. 2(a). Both end portions of each of the separation pieces respectively form a rectangular cutting surface 9a and a rectangular cutting surface 9b opposing the cutting surface 9a of an adjacent separation piece as shown in FIG. 2(c). In this case, the cutting surfaces 9a and 9b are not always limited to a right angle, and an angle thereof may be an acute angle or an obtuse angle, however, a right angle is preferable in view of assembling performance and accuracy of a gap.

Figure 3:
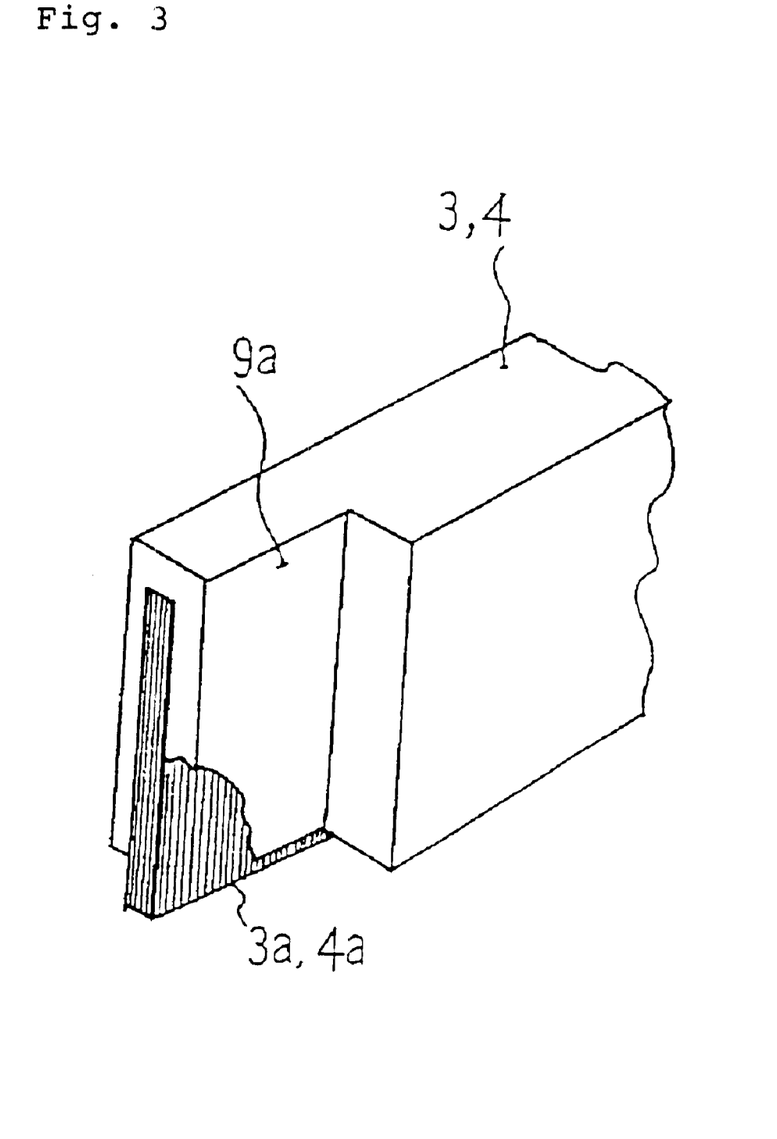
FIG. 3 is a perspective view which shows a shape of a perpendicular cutting surface of a brush seal in FIG. 2.

The separation piece forming both of the end portions connects the cutting surfaces 9a and 9b in an opposing manner as shown in FIG. 2(c), and is arranged so as to maintain a gap 10 in consideration of thermal expansion. Such a gap 10 is a perpendicular bypassing gap, and the flow resistance of the leaking air becomes higher than the straight flow passage, so that the leaking air is reduced in comparison with the conventional arrangement. Also, as shown in FIG. 2(b), FIG. 2(c) and FIG. 3, each end portion includes two axial faces interconnected by a wider radial face formed by the cut surfaces 9a, 9b.

Further, an illustration is omitted, however, the width of a seal fin in the seal ring 2 becomes wide, however, the separation piece can be connected by making the width of the seal fin portion to form the cutting surface in the same manner as that mentioned above. In this case, a shape of the brush seals 3 and 4 and the cutting surface 9a are shown in FIG. 3, however, the brush seal is structured so as to have brushes 3a and 4a at a center thereof.

In accordance with the first embodiment described above, the brush seals 3, 4 and the seal ring 2 are provided on the upstream side and the downstream side of the seal ring holding ring 1, respectively. Also, the separation pieces are arranged so as to maintain a gap 10 by placing the seal ring 2 and the separation end portions of the brush seals 3, 4 so that the cutting surfaces 9a and 9b oppose each other. Thereby, the leaking amount of the sealing air is reduced and the sealing performance is improved. Further, the amount of air is reduced and the performance of the entire gas turbine is improved.

Figure 4:
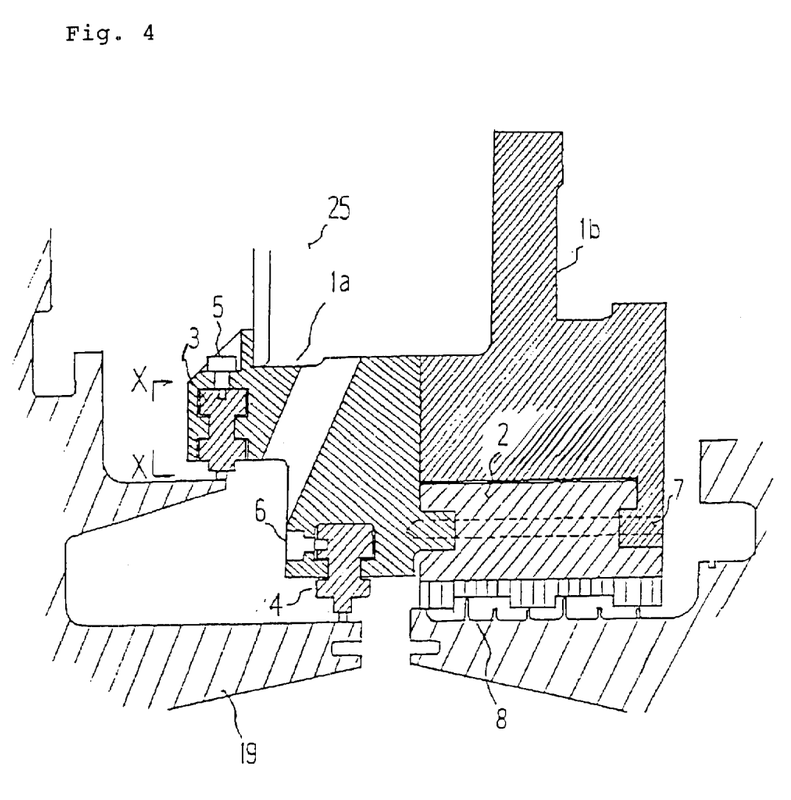
FIG. 4 is a cross sectional view which shows a structure of a seal separation surface of a gas turbine in accordance with a second embodiment of the invention.

FIG. 4 is a cross sectional view which shows a structure of a seal separation surface of a gas turbine in accordance with a second embodiment of the invention. The second embodiment differs from the first embodiment, shown in FIG. 1, in that the seal ring holding ring 1 is separated into portions 1a and 1b, the brush seals 3, 4 are mounted on the portion 1a, and only the seal ring 2 is mounted on the portion 1b.

In accordance with the second embodiment mentioned above, it is possible to independently process and assemble the brush seals 3, 4 on the seal ring holding ring 1a and process and assemble the seal ring 2 on the seal ring holding ring 1b, respectively, thereby allowing the assembly operation to be easily performed. Note that the shape, operation and effect of the cutting surfaces of each of the separation pieces in the seal ring 2 and the brush seals 3, 4 are the same as those of the first embodiment.

In this case, in accordance with the first and second embodiments of the invention, the description is given of the embodiment in which the brush seals 3, 4 are used in the upstream side of the seal ring holding ring 1 and the seal ring 2 is used in the downstream side thereof. However, of course, when the structure is formed such that the cutting surfaces 9a and 9b, as shown in FIG. 2, are formed at both ends of each of the separation pieces of the seal ring 66 in accordance with the conventional embodiment shown in FIG. 9 so as to form the gap 10, the same effect can be obtained. However, in accordance with the present embodiment using the brush seals 3, 4, the sealing performance is further improved by the brush seal in comparison with the conventional seal portion 68 and the structure in which the cutting surfaces 9a and 9b are provided only in the seal ring 66.

Figure 5:
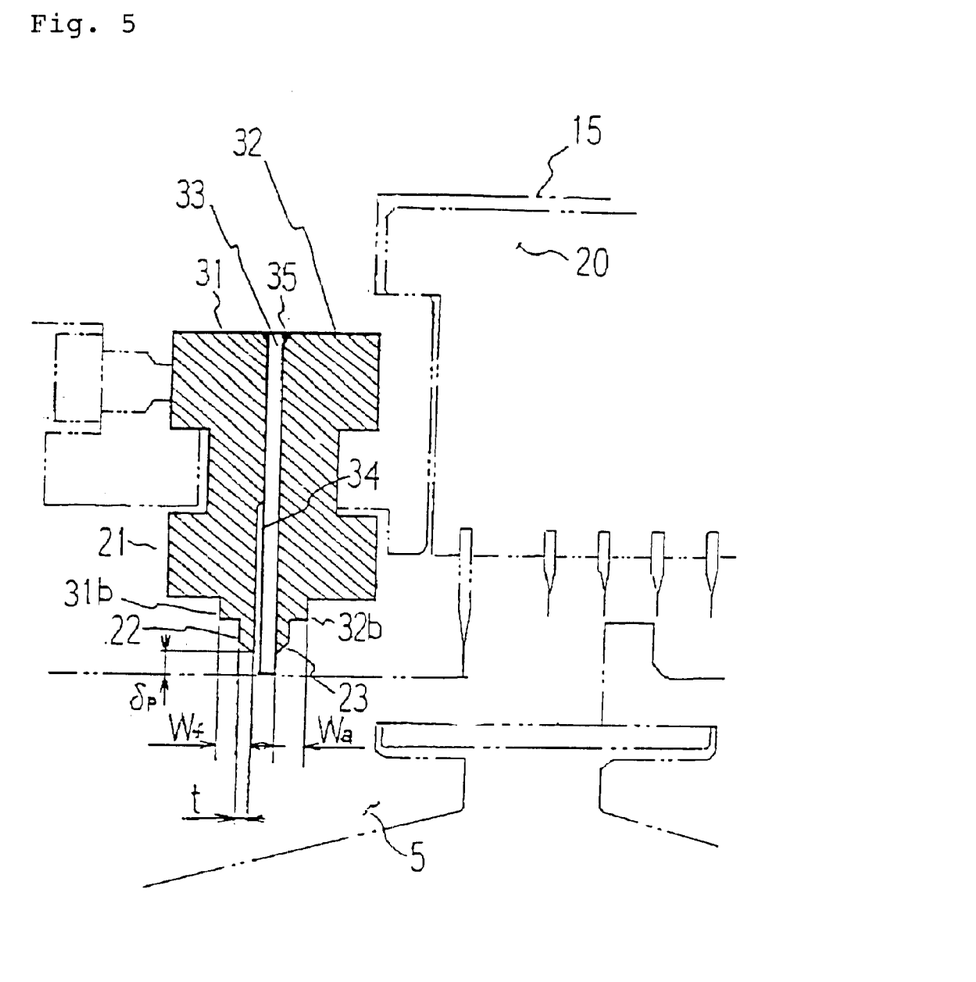
FIG. 5 is a cross sectional view of a brush seal of a gas turbine in accordance with a third embodiment of the invention.

FIG. 5 is a cross sectional view of a brush seal of a gas turbine in accordance with a third embodiment of the invention. Since a characteristic portion of the invention exists in a portion of front ends 22 and 23 of support plates and the other structure is the same as the conventional embodiment shown in FIG. 7, a detailed description thereof will be omitted and the description will be given by citing the portions as they are.

In FIG. 5, reference numerals 22 and 23 denote front end portions of front and rear support plates 31 and 32, respectively. The shape thereof is structured such that plate base portions 31b and 32b have the same width Wf and Wa as the conventional ones and the front ends 22 and 23 of the support plates are formed at the front end portions thereof.

A width t of the front ends 22, 23 is within a range of 0.2 to 0.8 mm, and the most preferable range is 0.5 to 0.8 mm, and the front ends are formed in a thin fin shape. The conventional widths Wf and Wa, shown in FIG. 7, are about 2 mm thickness, however, the conventional front ends 31a and 32a strongly contact the rotor side due to the rigidity thereof, so that the rotor side is damaged, and in some cases, the operation is greatly influenced so that replacement of an important part of the gas turbine and the like becomes necessary.

With respect to the preferable range mentioned above, when the width is 0.5 mm or less, a high degree of working accuracy is required in order to provide for sufficient strength so as to support a pressure difference, and when the width is 0.8 mm or more, there is a possibility that damage will occur due to contact with the rotor.

In accordance with the present embodiment; by forming the front ends 22, 23 in a thin fin shape, even in the case of being brought into contact with the rotor side, the front ends 22, 23 will deform and slide together with the front end of the brush 33 due to elasticity thereof, and the front ends 22, 23 themselves will break while avoiding breakage or damage of the disc side, so that no fatal damage occurs on the rotor side.

Further, since even when the front ends 22, 23 are brought into contact in the manner mentioned above, the rotor side is not damaged, it is possible to further reduce a gap δ p between the front ends 22, 23 and the surface of the disc 105 (refer to FIG. 11) in comparison with the conventional one, and it is possible to improve the sealing performance in comparison with the conventional brush seal, so that it is possible to significantly reduce the sealing air, thereby contributing to improved performance of the entire gas turbine.

In this case, in the embodiment mentioned above, the description is provided of the embodiment in which the front ends 22 and 23 of the support plate are worked in the support plate base portions 31b, 32b so as to be formed in a thin fin shape, respectively, however, the invention is not limited to the illustrated embodiment, for example, the front end portions can be formed in a fin shape by forming them from the base portions 31b and 32b in a smooth curved surface such as a circular arc or a straight tapered shape, that is, it is sufficient to form a shape which has a certain level of movability in the case of being brought into contact, avoids serious contact, and does not damage the rotor side.

Figure 6:
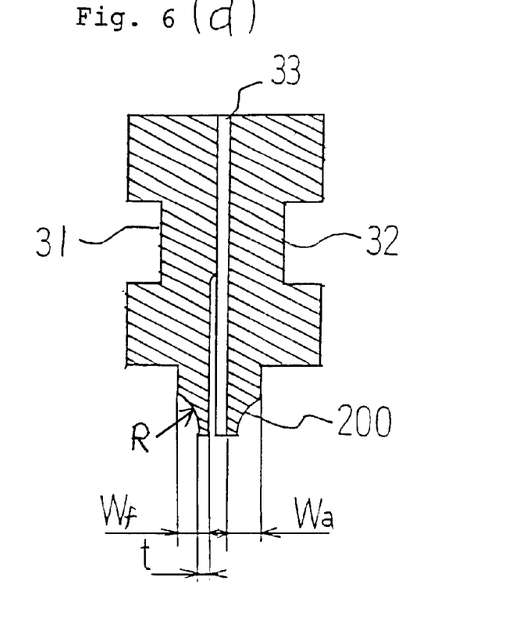

FIGS. 6(a) and 6(b) show the shapes mentioned above, and represent cross sectional views of a fourth embodiment, and corresponds to structures which further improve the shape of the front end portion in the brush seal shown in FIG. 5. FIG. 6(a) shows a structure in which the front ends 22, 23 of the support plate have circular arc shapes 200, and it is substantially set such that a width t=0.2~0.5 mm, R=2.5 mm and Wa, Wf=2.5 mm. Further, FIG. 6(b) shows a structure in which the front ends are formed with straight tapers 201, and in the same manner it is substantially set such that a width t=0.2~0.5 mm and Wa, Wf=2.5 mm.

With the circular arc shape 200 in FIG. 6(a), it is possible to provide sufficient strength of the front end by gradually changing t, and also with the straight taper 201 in FIG. 6(b), in the same manner, it is possible to secure sufficient strength of the front end by linearly changing the width thereof.

As mentioned above, in the brush seal in accordance with the third and fourth embodiments of the invention, since the front ends 22, 23 of the support plate are made thinner than the conventional widths Wf, Wa so as to form a thin fin shape, it is possible to prevent the rotor side from being damaged even when being brought into contact with the rotor side due to the thermal deformation and the like, so that it is possible to safely operate the gas turbine without fatally damaging the rotor. Further, since the gap δ p with respect to the rotor side can be made smaller than in the conventional one, a sealing performance can be improved.

What is claimed is:

1. A seal structure for a gas turbine comprising:

a seal ring holding ring supported on an inner shroud of a stationary blade;

a circular seal portion supported by said seal ring holding ring and surrounding a periphery of a rotor, said circular seal portion including a brush seal disposed at an upstream side of the inner shroud with respect to a main current gas flow, and a labyrinth seal disposed at a downstream side of the inner shroud with respect to the main current gas flow, wherein each of said brush seal and said labyrinth seal is formed of a plurality of sections, and each of said sections of said brush seal and said labyrinth seal has opposite end portions that are each defined by rectangular cut surfaces that oppose and contact adjacent rectangular cut surfaces of adjacent ones of said sections, wherein a predetermined gap is provided between said adjacent ends of said sections to account for thermal expansion of said brush seal and said labyrinth seal, and each of said contacting adjacent rectangular cut surfaces of said sections defines a non-linear path, defined by two axially extending segments interconnected by a radially extending segment, so as to reduce the amount of sealing air leaking through said gap, wherein said radially extending segment is longer than said axially extending segments, and at least one of said axially extending segments extends through a majority of the axial length of said respective section.

2. The seal structure as claimed in claim 1, wherein said seal ring holding ring includes a first portion and a second portion that is separate from said first portion, and one of said first and second portions supports said brush seal and the other of said first and second portions supports said labyrinth seal.

3. The seal structure as claimed in claim 1, wherein said seal ring holding ring includes an upstream portion and a downstream portion that is formed separately from said upstream portion, and said brush seal is supported on said upstream portion and said labyrinth seal is supported on said downstream portion.

4. The seal structure as claimed in claim 1, wherein said brush seal comprises:

a front support plate having an end portion;

a rear support plate having an end portion; and a brush supported between opposing inner surfaces of said front and rear support plates, said brush having an end portion that is adapted to form a seal with a rotary portion on a rotor side of the gas turbine, wherein each of said end portions of said front and rear support plates has an axial thickness of 0.2 to 0.8 mm and a distance between outer surfaces of said front and rear support plates becomes reduced in a direction toward the end portion of said brush.

5. The seal structure as claimed in claim 4, wherein each of said outer surfaces of said front and rear support plates defines a smooth curved surface at said end portions.

6. The seal structure as claimed in claim 4, wherein each of said outer surfaces of said front and rear support plates defines an inwardly tapered surface at said end portions of said support plates.

7. The seal structure as claimed in claim 4, wherein said inner surfaces of said front and rear support plates are generally perpendicular to a rotary axis of the rotor, and said outer surfaces of said front and rear support plates are each inwardly tapered in a direction toward said brush so as to reduce the thickness of said front and rear support plates in a direction toward the rotor.

8. The seal structure as claimed in claim 4, wherein said inner surfaces of said front and rear support plates are generally perpendicular to a rotary axis of the rotor, and said outer surfaces of said front and rear support plates define concave surfaces at said end portions thereof such that the thickness of each of said front and rear support plates is reduced in a direction toward the rotor.

9. A seal structure for a gas turbine comprising:

a seal ring holding ring supported on an inner shroud of a stationary blade;

a first brush seal supported by said seal ring holding ring on an upstream side thereof with respect to a main current gas flow, said first brush seal including a plurality of sections having predetermined gaps for accommodating thermal expansion of said first brush seal;

a labyrinth seal supported by said seal ring holding ring on a downstream side thereof with respect to the main current gas flow, said labyrinth seal including a plurality of sections having predetermined gaps for accommodating thermal expansion of said labyrinth seal; and a second brush seal supported by said seal ring holding ring between said first brush seal and said labyrinth seal, said second brush seal including a plurality of sections having gaps for accommodating thermal expansion of said second brush seal, wherein each of said sections of said first brush seal, said labyrinth seal and said second brush seal has opposite end portions defining oppositely facing rectangular cut surfaces, wherein the rectangular cut surface at a first end of one of said sections confronts a rectangular cut surface at a second end of another of said sections so as to define a path having axial segments interconnected by a radially extending segment that is generally perpendicular to said axial segments, and wherein said radially extending segment is longer than said axial segments, wherein at least one of said axial segments extends through a majority of the axial length of said respective section.

* * * * *